United States Patent [19]

Jarboe et al.

[11] Patent Number: 4,940,558

[45] Date of Patent: * Jul. 10, 1990

[54] METHOD FOR MOLDING ARTIFICIAL URETHANE ROCK

[75] Inventors: Enos D. Jarboe, University City; Rodney D. Jarboe, Creve Coeur; Edward M. Barclay, Affton, all of Mo.

[73] Assignee: Futura Coatings, Inc., St. Louis, Mo.

[*] Notice: The portion of the term of this patent subsequent to Jul. 11, 2006 has been disclaimed.

[21] Appl. No.: 377,713

[22] Filed: Jul. 10, 1989

Related U.S. Application Data

[63] Continuation-in-part of Ser. No. 128,029, Dec. 3, 1987, Pat. No. 4,847,026.

[51] Int. Cl.⁵ .............................................. B29C 67/22
[52] U.S. Cl. ................................. 264/46.7; 264/46.4; 264/220; 264/225
[58] Field of Search .................. 264/46.4, 46.7, 220, 264/225, 226

[56] References Cited

U.S. PATENT DOCUMENTS

| | | | |
|---|---|---|---|
| 3,703,572 | 11/1972 | Bellasalma | 264/220 |
| 3,723,584 | 3/1973 | Nussbaum | 264/220 |
| 3,883,627 | 5/1975 | Fitts | 264/220 |
| 3,950,477 | 4/1976 | Di Giacomo | 264/338 |
| 4,650,625 | 3/1987 | Pentlow | 425/175 |
| 4,668,451 | 5/1987 | Langson | 264/225 |
| 4,847,026 | 7/1989 | Jarboe et al. | 264/220 |

Primary Examiner—David Simmons
Assistant Examiner—Allan R. Kuhns
Attorney, Agent, or Firm—Robbins & Robbins

[57] ABSTRACT

A method for producing a simulated rock by spraying a high density polyurethane elastomer in a flexible rubber mold. The rubber may be natural rubber or synthetic rubber. A rock is produced in molded form, not limited in size. A flexible mold is prepared by applying numerous coats of liquid uncured rubber forming materials, such as latex rubber, upon the rock exterior in combination with a fabric embedded within the rubber latex layers. A supporting cradle for the rubber mold is produced by spraying a low density urethane foam composition over the mold. The mold and cradle are stripped from the rock and are sprayed with a two component structural urethane system employing an isocyanate component and a polyol component with appropriate catalysts, fillers and additives. The structural urethane elastomer is built up to substantial thickness to provide a strong rigid load bearing polyurethane molded rock simulating the original rock surface with curing taking place in a matter of seconds or minutes. After cooling, the molded urethane rock is removed and the mold may be reused for repeated molding operations. Where desired, the molded urethane rock may be reinforced with an inner layer of low density urethane foam to reduce the amount of structural urethane employed.

16 Claims, 1 Drawing Sheet

METHOD FOR MOLDING ARTIFICIAL URETHANE ROCK

RELATED APPLICATION

This application is a continuation-in-part of our copending U.S. application Ser. No. 128,029, filed Dec. 3, 1987, now U.S. Pat. No. 4,847,026.

BACKGROUND OF THE INVENTION

In the past, artificial rocks have been made by a variety of processes.

Polyester fiberglass has been employed in the past for producing artificial rocks but presents a problem in that of requiring a gel coat or barrier coat to be first sprayed in the mold. The polyester resin conventionally employed for structural strength requires fiberglass reinforcing due to the inherent brittleness of the polyester resin. Also low production is encountered limited to one or two parts per mold per day.

Plaster and concrete have also been employed but are of disadvantage in that they are too heavy for producing large specimens. Durability, weathering and resistance to cracking and chipping represent further problems. Production is also generally limited to one or two parts per mold per day.

A particular problem has been presented in molding artificial rocks. Such rocks may be made in solid form of one type of plastic or another but have been limited in variety of design because of the high cost of molding as well as requiring time for production of both the mold and the molded product. For landscaping purposes different sizes and types of artificial rocks are desirable and high mold costs and operation expenses may be limiting factors in the production of such rocks of different size and appearance to simulate a natural setting.

A further problem has been in the presentation of self-supporting substantial rigid artificial rocks of durability, strength and hardness that can withstand the rigors of the environment wear and tear that might be occasioned. Such rocks, if used in an outdoor setting, must be able to withstand a load and weathering over a period of time and substantial physical abuse by the public that may be encountered in the landscape or other type of setting in which they are employed.

SUMMARY OF THE INVENTION

By means of this invention there have been provided artificial rocks of varied shapes, surface appearance and sizes. The rocks may be used in landscape settings of one type or another to simulate natural rocks. Their light weight, strength and resistance to weathering provide a wide range of usage.

The artificial rocks are simply prepared by the employment of a two component isocyanate and polyol which cures in minutes to form a process commonly known in the trade by the acronym SIM, "SPRAY-IN-MOLD". The spraying is accomplished with two component proportioning equipment and impingement mix or static mix plural spray gun.

In the manufacture of the artificial rock of this invention a flexible rubber mold is first prepared using the rock to be simulated as a model. The rubber mold may be either of natural rubber or synthetic rubber and it will be understood that the term "rubber" encompasses both types and may also be described as elastomeric. The flexible mold is simply and cost efficiently prepared by applying liquid uncured rubber forming materials, such as multiple coats of latex, to the exterior of the rock. A reinforcing material, such as cheese cloth or the like is employed at intermediate stages of the application of the latex layers to provide integrity to the built up layers of latex which comprise when cured the rubber mold.

In order to provide support for the mold, a cradle support is provided by spraying low density polyurethane foam at a substantial thickness on the exterior of the rubber mold. The cradle support ensures that the mold which is in the form of a flexible liner holds the shape of the rock model when removed.

After the spraying has been completed and allowing a short period of time for cooling of the molded urethane artificial rock, the mold and cradle are easily separated from the rock. The mold and cradle may then by employed for repetitive spary molding operations to produce additional artificial rocks as desired.

In the carrying out of the spray molding process a 100% solids system is utilized. As a result there are no solvents and thus the system meets all EPA VOC (volatile organic content) limits and reduces fire hazards due to flammable volatiles.

The urethane system employed in the production of the artificial rock is comprised of an isocyanate component and a polyol component. The polyol component or side employs polyalcohols or polyamines having OH or $NH_2$ functional groups from 2 to 8 that do react. Also usable are unsaturated polyester resins with vinyl monomers that provide reactive sites in addition to OH or $NH_2$ sites. Liquid modifiers may be incorporated as plasticizers that do not react as well as unreactive solid modifiers for fillers. Foaming or blowing agents may be used such as low boiling point liquids or low temperature decomposing substances or conventional water blowing methods. Catalysts may be employed or organometals and amines that promote reactions of OH:NCO, $H_2$NCO, $NH_2$:NCO or NCO:NCO or polymerization of unsaturated components. To provide color and varied surfaces to the artificial rock, colorants, dispersion dyes and pigments may be added. To reduce ultra-violet oxidation and enhance weathering anti-oxidants and ultra-violet absorber additives may be utilized.

In the isocyanate component or side various isocyanates, polymeric and monomeric, may be employed with NCO functional groups varying from 2 to 8. Also employable are products of the above isocyanates with polyols and amines to produce prepolymers terminated with NCO functionality. These can further be modified by the unreactants listed above.

Where desired an additional low density urethane reinforcing layer may be sprayed upon the inner surface of the molded rock. By this means, the high density structural urethane rock shell may be made somewhat thinner with a thicker layer of the reinforcing low density urethane foam to provide an economy in cost of production and a lighter weight rock.

The above features are objects of this invention. Further objects will appear in the detailed description which follows and will be further apparent to those skilled in the art.

For the purpose of illustration of this invention, a preferred embodiment thereof is shown in the accompanying drawing. It is to be understood that the drawing is for purpose of description only and that the invention is not limited thereto.

IN THE DRAWING

DESCRIPTION OF THE INVENTION

In this invention urethane compositions are employed that are 100% solids (solventless) and that avoid solvent evaporation and evironmental problems of volatile organic content (VOC) associated therewith. The urethane compositions may be applied by conventional spraying techniques into an open mold process to provide a high structural modulus with substantial load bearing characteristics and high fidelity reproduction.

The structural urethane employed provide a fast cure enabling finished parts to be demolded after cooling in two to fifteen minutes compared to four to eight hours as in the case of a FRP, i.e. fiberglass reinforced polyester or concrete. The properties of the molded urethane product may be varied from flexible to stiff without the requirement of fiberglass reinforcing. The molded product has not only good structural strength but is lightweight and resistant to corrosion and weathering. The structural urethane product has excellent "wet-out" to the mold surface and reproduces in fine detail to provide a high fidelity end product.

The various properties of the structural urethanes have been found to provide a unique advantage in producing artificial rocks of various sizes and configurations which can be utilized in a myriad of usages, such as landscaping, zoos, amusement parks, gardens of one type or another and the like. With the spray molding process of this invention some four to six rocks, as an example, may be produced per hour instead of one or two a day from a mold. The two components structural urethane compositions can be sprayed directly on a mold without the need of a "gel" or "barrier" to produce faithfully existing surface detail without voids, pinholes or other surface defects that would accur with a conventional FRP polyester without a barrier coating. The end product is lightweight compared to plaster or concrete artificial rocks or the fiberglass reinforced polyester.

Figure 1:
FIG. 1 is a view in front elevation showing a rock to be simulated.

The mold employed in this invention is unique and can be fabricated to provide a relatively inexpensive mold production which can be utilized without the requirement of expensive and complex molds. In the preparation of the mold the native rock used as a model for the artificial urethane rock to be reproduced, exemplified by the rock 10 in FIG. 1, is first cleaned as with soap and water. After rinsing, the rock is dried. A uniform application of liquid uncured rubber forming materials, such as latex rubber (prevulcanized), is then brushed on the rock surface to a wet thickness of 15 to 20 mils. The coating is dried for thirty to sixty minutes until dry to the touch. A slight tack to the coating is acceptable for further coats. Such further coating is effected by repeating the above described brush coating to build up to four to six coats.

After the above first stage of coating has been effected a reinforcing fabric, such as cheese cloth or the like, is added to an additional brushed latex coating by embedding after a short dry period of about fifteen minutes. The thichness of the mold is continued to be built up with additional coats of the reinforcing fabric and latex until a thickness of ⅛ to ¼ inch is achieved with a final coat of latex being brushed upon the last fabric layer. The recoat time subsequent to embedding the fabric will be approximately eight to twelve hours depending on the desired thickness.

Instead of natural rubber various synthetic rubber compositions may be employed. As an example, a synthetic rubber such as silicone rubber or a flexible urethane rubber maybe utilized. Such compositions may be applied as uncured liquid coating and cured to form the rubber mold. As an example, a flexible silicone rubber mold may be employed such as General Electric RTV 630 which is a two part system employing 10 parts of silicone forming compound with one part curing agent. This provides a liquid uncured rubber forming material which is applied to the rock used as a model. After application of the liquid uncured material to the rock the silicone rubber forming material may be cured at room temperature for 12–48 hours or at a temperature of 300° F. for one-half hour. Additionally, a two component urethane elastomer system may be used. The two component system, such as Conathane TU-4010 of Conap, Inc. provides a liquid low viscosity uncured material which may be applied to the rock model and cured at room temperature for 24–48 hours or at elevated temperatures such as six hours at 176° F.

Figure 2:
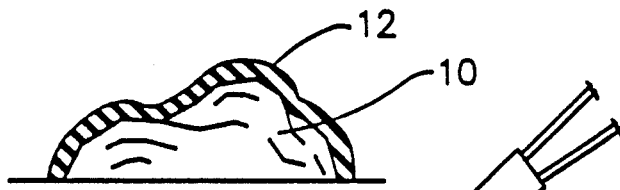
FIG. 2 is a view similar to FIG. 1 showing the flexible rubber mold in place upon the rock.
Figure 3:
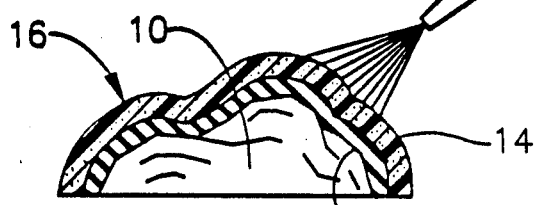
FIG. 3 is a view similar to FIG. 2 showing the spraying of a two component, low density urethane foam forming the cradle.
Figure 4:
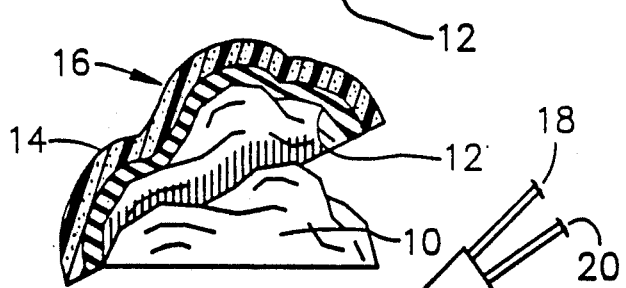
FIG. 4 shows the foam cradle and rubber mold being stripped from the rock.

In order to support the rubber mold shown by the reference numeral 12 in FIG. 2 when it is stripped from the rock model a cradle 14 as shown in FIG. 3 is prepared to hold the configuration of the rock model. The cradle is produced by spraying on the exterior of the rubber mold one to ten pound density polyurethane foam at a thickness of two to four inches with an "Instant Foam" pack or equivalent material. A more solid cradle may be prepared with density of 10–65 lbs. at a ¼ to 1 inch thickness. After the preparation of the cradle and latex mold to form a completed composite cradle and mold 16, it is carefully demolded from the rock model as shown in FIG. 4 and allowed to cure at 75°–100° F. for twenty four to forty eight hours before use.

The urethane spraying of the interior of the cradle and mold 16 is carried out employing heated plural component equipment for delivering the isocyanate side and polyol side to the spray gun where the reaction is initiated in a mixing chamber inside the gun. An exact ratio of the isocyanate and polyol components is metered to the spray gun which mixes and produces a controlled spray pattern. The isocyanate and polyol components are generally 1:1 in ratio but may vary from 1:10 to 10:1 of this ratio. Portable, prepackaged pressurized foam packs can also be used for producing the cradle.

Conventional plural equipment, such as that manufactured by Gusmer, Glascraft, Graco or Binks, forming no part of this invention, is used to spray the structural urethane elastomer. The spray parameters of temperature and pressure employed in the process entail the use of a primary heater at approximately 100°–160° F.

and a hose heat corresponding to the primary heater and a spraying pressure ranging from 500 PSI to 3,000 PSI. The structural urethane elastomer is sprayed into the interior of the rubber mold to build up a thickness of 10 mils to 1 inch. Typical thickness are around ⅛ to ¼ inch. The structural urethane produced can vary in density from 20 to 90 PCF, (pounds per cubic foot) with typical density to 50-70 PCF. Conventional reinforcing, such as fiberglass, may be added while spraying. On larger rocks, the high density structural urethane elastomers may be used in combination with low density foam. This composite provides the balance of economy and weight.

Figure 5:
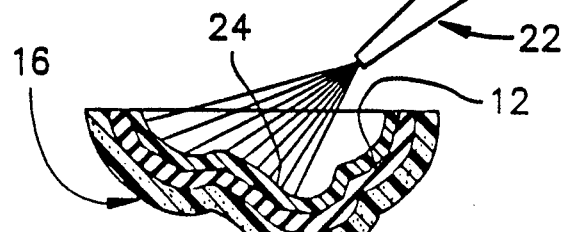
FIG. 5 is a view in vertical section through the mold and cradle, showing the spraying of the two-component 100% solids urethane system.
Figure 6:
FIG. 6 is a view similar to FIG. 1, partially broken in section showing the molded artificial rock.
Figure 7:
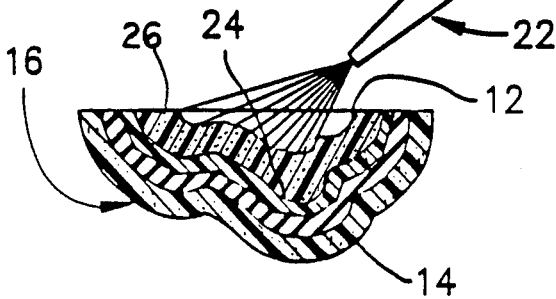
FIG. 7 is a view similar to FIG. 5 showing the spraying of a reinforced urethane foam on the artificial rock.

FIG. 5 shows a typical spraying operation in which the isocyanate and polyol components are introduced through hoses 18 and 20 to a spray gun 22 to form the polyurethane artificial rock 24. The spraying may be carried out with Gusmer spray equipment with primary heaaters set at 120° F., hose temperatures at 140° F. and a spraying pressure of approximately 1,000 PSI. The spray molded rock 24 after cooling may be separated from the cradle 14 with the flexible mold 12 as shown in FIG. 4. The cradle is self-supporting and has a slight degree of flexibility which facilitates the demolding or stripping of the rock from the mold 12 and cradle 14. In some cases the cradle 14 may be removed from the mold 14 and the rock 24. The mold may then be stripped from the rock and due to its flexibility and shape retention easily inserted in the cradle for further molding operations. The finished polyurethane rock 24 after demolding is shown in FIG. 6 and provides a high fidelity simulation to the natural rock model 10 in FIG. 1.

Where desired the rock may be spray-molded in composite form with the interior of the rock 24 being sprayed with a low density urethane foam layer 26 as shown in FIG. 7. In this manner the load bearing high density solid urethane shell 24 may be made somewhat thinner such as one-sixteenth of an inch to one-eight inch thickness and reinforced with a thicker layer of urethane foam 26. The more expensive high density solid urethane may thereby be conserved by the use of the lower cost urethane foam with a lesser weight while producing a strong structurally sound artificial urethane rock.

The urethane foam may be of the same type previously described for use as the cradle 16 with a density of one to ten pounds per cubic foot. The foam is applied by the same spray in mold process.

The spray molded artificial polyurethane rock 24 has a high flexural modulus and self-supporting strength with the following physical properties when cured:

| PROPERTY | TEST METHOD | RESULTS | RANGE |
|---|---|---|---|
| Tensile Strength, PSI | D-028 | 6800 ± 100 | 3000–9000 |
| Elongation, % | D-628 | 20% ± 2 | 5–100% |
| Flexural Modulus, PSI | D-790 | 265,000 ± 1000 | 50,000–450,000 |
| Heat Sag, inches | D-3769 | 0.15 ± .025 | 0–3 |
| Hardness, Shore D | D-2240 | 77 ± 2 | 30–80 |
| Density, PCF | D-792 | 68 ± 3 | 10–80 |

A typical formulation of the structural polyurethane spray molding composition employed for the SIM spraying of the interior of the mold 16 to produce the rock shell 24, as shown in FIG. 5 is disclosed in the following example:

EXAMPLE

To spray inside the mold:

|  | By Weight |
|---|---|
| ISOCYANATE SIDE | 100 parts |
| Polymeric MDI (polymethylene polyphenol isocyanate) Circa 32.1% NCO | |
| POLYOL SIDE | |
| Polyether Triol 250 OH# | 21.8% |
| Polyether Diol 28 OH# | 49.2 |
| Polyether Tetrol 770 OH# | 13.1 |
| Glycol Extender 1810 OH# | 15.8 |
| DBTDL | 0.1 |
|  | 100.0% |

The isocyanate and polyol sides are mixed 1:1 by volume using Gusmer proportioning equipment (or similar equipment) to spray the material into a mold. The cured artificial rock 24 is ready to pull in 5 minutes or less.

In the above example the isocyanate and polyol components have typical properties as follows:

| PROPERTY (WET) | SPECIFICATION | RESULTS |
|---|---|---|
| Weight (lbs/gal): | ASTM D-1475 | |
| Component Isocyanate | | 10.5 ± 0.2 |
| Component Polyol | | 9.0 ± 0.2 |
| Solids by Weight: | ASTM D-1353 | 100% |
| Mix Ratio: | Isocyanate:Polyol by volume | 1:1 |
| Viscosity: | LV4/60RPM | |
| Component Isocyanate | | 110 CPS |
| Component Polyol | | 800 CPS |

In the isocyanate component various isocyanates, polymeric and monomeric, may be employed. The NCO functional groups vary from two to eight. Products of the above isocyanate may also be employed with polyols and amines to produce prepolymers having terminal groups with NCO functionality. The polyol component employs polyalcohols or amines having OH or $NH_2$ functional groups from 2 to 8 that react with isocyanates. Also usuable are unsaturated polyester resins with vinyl monomers that provide reactive sites for hybrid reactions in addition to OH sites. Liquid modifiers may be incorporated as plasticizers that do not react as well as unreactive solid modifiers for fillers. Foaming or blowing agents may be used such as low boiling point liquids or low temperature decomposing substances. Catalysts may be employed or organometals and amines that promote reactions of OH:NCO, $H_2O$:NCO, $NH_2$:NCO or NCO:NCO or polymerization of unsaturated components. To provide color and varied surfaces to the artificial rock, colorants, dispersion dyes and pigments may be added. To reduce ultraviolet oxidation and enhance weathering anti-oxidation and ultraviolet adsorber additivies may be utilized.

In this invention various conventional isocyanates may be employed such as the organic aromatic and aliphatic polyisocyanates or mixtures thereof. Organic aromatic polyisocyanates for example may be those two or more NCO groups, such as 2,4-toluenediisocyanate, 2,6-toluenediisocyanate, 4,4'-diphenylmethane diisocyanate, p-phenylene diisocyanate, naphthalene diisocyanate, polymethylene polyphenyl isocyanates or mixtures thereof, aromatic polyisocyanates and the prepolymers prepared from such isocyanates and compounds having 2 or more active hydrogen atoms.

Organic aliphatic polyisocyanates include in addition to the hydrogenated derivations of the above aromatic polyisocyanates, 1,6-hexamethylene diisocyanate, 1,4-cyclohexyl diisocyanate, 1,4-bis isocyanoctomethyl-cyclohexane and mixtures thereof.

The polyols may be of a wide range. Suitable compounds include any difunctional or polyfunctional hydroxyl compounds having a molecular weight below about 1800 such as, 1,2- and 1,3-propylene glycol; 1,4- and 2,3-butylene glycol; 1,6-hexane diol; 1,8-octane diol; neopentyl glycol; cyclohexane dimethanol (1,4-bis-hydroxy-methyl cyclohexane); 2-methyl-1,3-propane diol; glycerol; trimethylol propane; 1,2,6-hexane triol; 1,2,4-butane triol; trimethylol ethane; pentaerythritol; quinitol; mannitol and sorbitol; methyl glycoside; diethylene glycol; triethylene glycol; tetraethylene glycol; polyethylene glycol; dipropylene glycol; dibutylene glycol and polybutylene glycols. It is of course also possible to use polyols containing further hetero atoms such as nitrogen or sulphur, or double bonds. These include, N-methyl diethanolamine; N-ethyl diethanol amine; di-$\beta$-hydroxy ethyl aniline; N-cyclohexyl diethanolamine; triethanolamine, di-$\beta$-hydroxy ethyl sulphide; 2-butene-1,4-diol; di-$\beta$-hydroxy ethyl urea; and di-$\beta$-hydroxy ethyl urethane.

Chain extenders may also be employed with the polyol component. Suitable hydroxyl-containing chain extenders which are free of aliphatic amine hydrogen atoms include, for example, ethylene glycol, propylene glycol, trimethylol propane 1,4-butane diol, diethylene glycol, dipropylene glycol, bisphenols, hydroquinone, catechol, rescorcinol, triethylene glycol, tetraethylene glycol, dicyclopentadienediethanol, glycerine, low molecular weight ethylene and/or propylene oxide derivatives of glycerine, ethylene diamine, diethylenetriamine, mixture thereof and the like.

Suitable aliphatic amine-containing chain extenders having at least one primary amine group which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis (p-aminocyclohexyl) methane, triethylenetetramine, tetraethylenpentamine, mixture thereof and the like.

Also suitable are the aminated polyoxypropylene glycols having an average imino hydrogen equivalent weight of from about 60 to about 110.

Various catalysts may be employed in the production of the polyurethane and the SIM process. Amine containing polyols employed may or may not require a catalyst but those polyols not containing a nitrogen atom normally require a catalyst. Such catalysts may be, for example, organo-metal compounds, tertiary amines, alkali metal oxides and the like.

Organo-metal catalysts include, for example, organo-metal compounds of tin, zinc, lead, mercury, cadmium, bismuth, antimony, iron, manganese, cobalt, copper vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric proprionate, lead naphthenate, manganese naphthenate, copper naphthenate, vanadyl naphthanate, cobalt octoate, cobalt acetate, copper oleate, vanadium pentoxide, mixtures thereof and the like.

Amine catalysts include, for example, triethylenediamine, triethylamine, tetramethylbutanediamine, N,N-dimethylethanolamine. N-ethylmorpholine, bis(2-dimethylaminoethyl)ether, N-methylmorpholine, N-ethylpiperidine, 1,3-bis(dimethylamino)-2-propanol, N,N,N',N'-tetramethylethylenediamine, mixtures thereof and the like.

Alkali metal alkoxides which can be employed as catalysts for urethane formation include, for example, sodium ethoxide and potassium ethoxide.

In general the conventional various isocyanates, polyols, chain extender catalysts, fillers, blowing agents and other additives are well described in U.S. Pat. Nos. 4,065,410; 4,076,679; 4,125,487; 4,218,543 and 4,269,945 incorporated herein as referenced.

Various changes and modifications may be made within the invention as will be apparent to those skilled in the art. Such changes and modifications are within the scope and teaching of this invention as defined in the claims appended hereto.

What is claimed is:

1. A method for molding an artificial urethane rock which comprises selecting a rock to be reproduced, creating a flexible rubber mold and supporting cradle having a mold cavity conforming to the exterior of said rock, said mold having a substantial degree of flexibility and being created by applying an uncured liquid rubber forming material to said rock, curing said uncured liquid rubber forming material to produce said rubber mold, said cradle being formed by applying by spraying a low density urethane foam forming mixture to the exterior of the rubber mold to provide a self-supporting cradle, spraying a two sided urethane composition into the mold cavity, said urethane composition comprising an isocyanate side and a polyol side and being mixed in a spray gun in a spray-in-mold process, carrying out said spraying to build up the molded artificial urethane rock to a desired thickness and stripping said cradle and mold from the molded artificial urethane rock after curing.

2. The method of claim 1 in which the uncured liquid rubber forming material is a silicone forming material.

3. The method of claim 1 in which the uncured liquid rubber forming material is a urethane forming material.

4. The method of claim 1 in which the mold and supporting cradle is created by applying the liquid uncured rubber forming material on said rock in a multiplicity of layers, and a fabric is embedded between said layers.

5. The method of claim 1 in which selected pigments and fillers are added in the polyol side.

6. The method of claim 1 in which the artificial rock and rubber mold are removed from the cradle, the mold is then removed from the artificial rock and the mold is repositioned removed from the artificial rock and the mold is repositioned in the cradle.

7. The method of claim 1 in which the low density urethane foam has a density of one to ten pounds per cubic foot and is applied by spraying to a substantial thickness.

8. The method of claim 1 in which the molded urethane rock is reinforced by spraying a low density urethane foam upon an inner surface of said rock.

9. The method of claim 1 in which the two sides of the urethane composition are solvent free and are introduced separately into a reaction chamber of a spray gun to provide a 100% solids polyurethane artificial rock mold composition.

10. The method of claim 9 in which the isocyanate and polyol sides are introduced to the spray gun in a volume ratio of isocyanate to polyol of 1:1 to 1:8.

11. The method of claim 9 in which the isocyanate side comprises a polymeric 4-4'-diphenylmethane diisocyanate having a functionality of free NCO of 28-34%.

12. The method of claim 9 in which the polyol is a hydroxy containing polyester or polyether.

13. The method of claim 12 in which the polyol comprises a polyether triol, polyetherdiol and a polyethertetrol.

14. The method of claim 12 in which the polyol comprises substantially 22% polyethertriol having a hydroxy number of 250, 49% of a polyetherdiol having a hydroxy number of 28, 13% of polyethertetrol having a hydroxy number of 770, a glycol extender and a catalyst of dibutyltin dilaurate.

15. The method of claim 9 in which the isocyanate side comprises a polymeric 4-4'-diphenylmethane diisocyanate having a functionality of free NCO of 28-34% and the polyol is a hydroxy containing polyester or polyether.

16. The method of claim 15 in which the polyol comprises substantially 22% polyethertriol having a hydroxy number of 250, 49% of a polyetherdiol having a hydroxy number of 28, 13% of polyethertetrol having a hydroxy number if 770, a glycol extender and a catalyst dibutyltin dilaurate.

* * * * *